(12) United States Patent
Herold

(10) Patent No.: US 6,183,108 B1
(45) Date of Patent: Feb. 6, 2001

(54) LIGHTING APPARATUS WITH CONVEX-CONVEX LENS ASSEMBLY

(76) Inventor: Michael A. Herold, 367 High Grove Blvd., Akron, OH (US) 44312

( * ) Notice: Under 35 U.S.C. 154(b), the term of this patent shall be extended for 0 days.

(21) Appl. No.: 09/276,288

(22) Filed: Mar. 25, 1999

Related U.S. Application Data

(60) Provisional application No. 60/079,859, filed on Mar. 30, 1998, provisional application No. 60/101,480, filed on Sep. 23, 1998, and provisional application No. 60/108,133, filed on Nov. 12, 1998.

(51) Int. Cl.[7] .................................................. F21V 5/00
(52) U.S. Cl. ........................ 362/244; 362/332; 362/521
(58) Field of Search ................................... 362/277, 280, 362/285, 328, 331, 332, 335, 418, 367, 521, 520, 311, 244; 359/710, 799, 800

(56) References Cited

U.S. PATENT DOCUMENTS

| | | | |
|---|---|---|---|
| 4,257,672 | 3/1981 | Balliet | 385/35 |
| 4,641,929 | 2/1987 | Braat | 359/719 |
| 4,797,545 | * 1/1989 | Shikama | 250/201.5 |
| 4,847,734 | * 7/1989 | Katoh | 362/555 |
| 4,892,395 | 1/1990 | Suzuki et al. | 359/641 |
| 4,935,630 | 6/1990 | Merchant | 250/353 |
| 4,987,521 | 1/1991 | Fratty et al. | 362/512 |
| 5,068,768 | 11/1991 | Kobayashi | 362/539 |
| 5,148,356 | 9/1992 | Freese et al. | 362/130 |
| 5,161,875 | 11/1992 | Sekiguchi et al. | 362/466 |
| 5,187,377 | * 2/1993 | Katoh | 257/89 |
| 5,190,368 | 3/1993 | Sekiguchi | 362/539 |
| 5,343,325 | 8/1994 | Yamakawa | 359/205 |
| 5,463,707 | 10/1995 | Nakata et al. | 385/35 |
| 5,475,513 | 12/1995 | Nakanishi et al. | 359/5 |
| 5,499,168 | 3/1996 | Cochard et al. | 362/466 |
| 5,554,099 | 9/1996 | Heimberger et al. | 600/160 |
| 5,568,312 | 10/1996 | Horton | 359/435 |
| 5,584,568 | 12/1996 | Corbasson et al. | 362/268 |
| 5,631,763 | 5/1997 | Park | 359/206 |
| 5,673,990 | 10/1997 | Neumann et al. | 362/513 |
| 5,694,256 | 12/1997 | Winkler | 359/805 |
| 5,825,803 | * 10/1998 | Labranche | 372/101 |
| 6,007,210 | * 12/1999 | Yamamoto | 362/459 |

* cited by examiner

Primary Examiner—Sandra O'Shea
Assistant Examiner—Hargobind S. Sawhney
(74) Attorney, Agent, or Firm—Renner, Kenner, Greive, Bobak, Taylor & Weber

(57) ABSTRACT

A lighting apparatus includes a lens, such as a circular rod carried by a housing. A lamp or light is positioned adjacent the circular rod which has a convex entry portion and a convex exit portion to distribute a wide and intense beam of light to a desired area. Variations of the apparatus allow for distribution of the light in any desired pattern, either downwardly or outwardly, as desired by the particular end use. The apparatus eliminates the need for reflectors to assist in generating the beam, although mirrors may be employed to generate a triple high-intensity beam from a single light source.

22 Claims, 7 Drawing Sheets

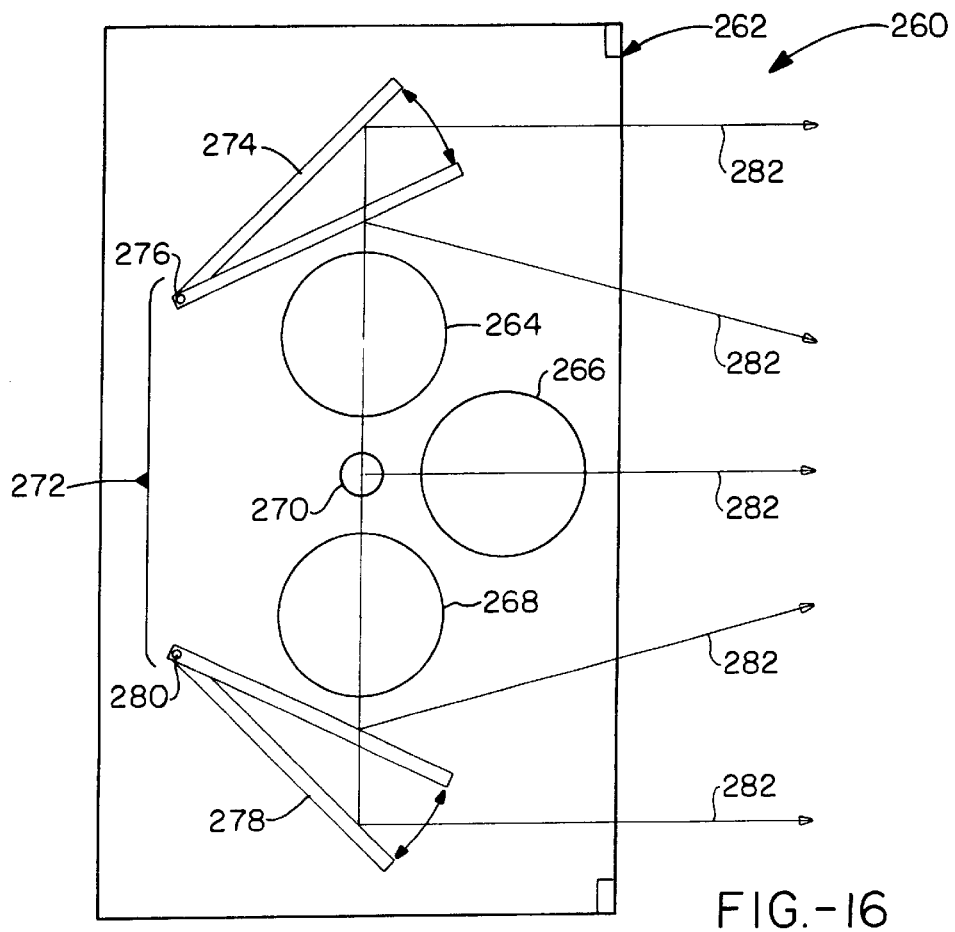
FIG.-16
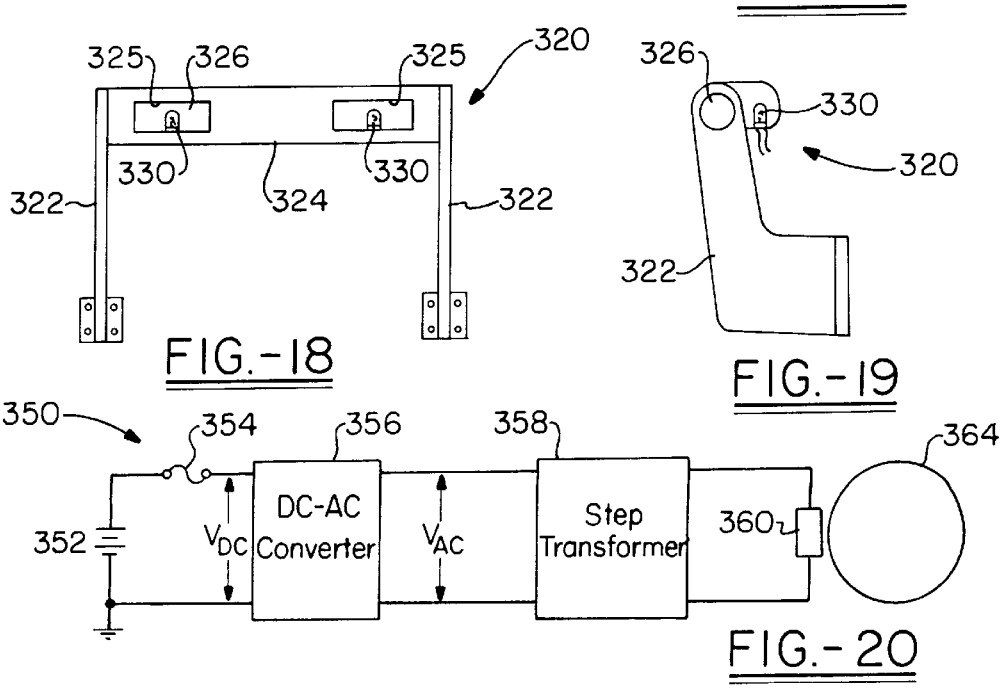
FIG.-18
FIG.-19
FIG.-20

LIGHTING APPARATUS WITH CONVEX-CONVEX LENS ASSEMBLY

CROSS-REFERENCE TO RELATED APPLICATIONS

This application claims benefit of Provisional Application Nos. 60/079,859 filed Mar. 30, 1998; 60/101,480 filed Sep. 23, 1998; and, 60/108,133 filed Nov. 12, 1998.

TECHNICAL FIELD

The present invention herein resides generally in the art of lighting devices. More particularly, the present invention relates to a light apparatus which has a lens that generates a bright wide beam oriented in any number of directions. Specifically, the present invention relates to a lighting apparatus which couples a round rod lens to a light source in various configurations to obtain a desired lighting effect.

BACKGROUND ART

It is well known that lighting devices are used to illuminate darkened areas. Such lighting devices are commonly used as car headlights, flashlights, spotlights, and any other use where it is desired to focus a light beam in a particular manner. For example, in special situations, such as where an automobile is driving in a heavily fogged area, an intense low-beam light is desired. The low beam is usually focused on the roadway to assist the driver in operating the automobile.

A common problem with known fog lights and other driving lights is that they either project a spot type beam or a beam that is diffused. In any event, there is no way for the user to modify the light once it is purchased. Although reflectors and mirrors may be employed to obtain the desired light shape, these reflectors are quite expensive and are easily misaligned.

One alternative is to provide "bullet lights." These are very small lights which project a small intense beam of light. However, a large quantity of these lights are required to produce a wide, high-intensity light beam. Moreover, none of the known lighting devices provide a light beam which is produced with only minimal power.

DISCLOSURE OF INVENTION

In light of the foregoing, it is a first aspect of the present invention to provide a lighting apparatus with convex-convex lens assembly.

It is thus an aspect of the present invention is to provide a housing which carries or supports a lens assembly, wherein the lens assembly is at least one circular rod which has a convex entry portion and a convex exit portion.

It is another aspect of the present invention, as set forth above, to include at least one light or lamp bulb adjacent the lens assembly, wherein the light is positioned no further away than a radial dimension of the circular rod.

It is a further aspect of the present invention, as set forth above, to include several light sources adjacent the lens assembly, wherein each light source is individually adjustable with respect to its position adjacent the rod for the purpose of selectively providing a unique light beam pattern.

It is yet another aspect of the present invention, as set forth above, to include a lens assembly with a plurality of circular rods with angled cuts at each end so as to abut one another, thus resulting in a wide light distribution pattern.

It is yet another aspect of the present invention, as set forth above, to include a lens assembly which has a flat portion received within a supporting bracket of the housing, wherein the flat lens includes a rod element with a convex entry portion and a convex exit portion.

It is still another aspect of the present invention, as set forth above, to include a housing which has a lens support bracket contained within the housing for carrying a circular rod lens and wherein the light is selectively positionable with respect to the lens.

It is still a further aspect of the present invention, as set forth above, to provide a lens assembly with four lenses with angular cuts which abut one another, wherein a center opening is formed to receive a light therein to generate a 360° light distribution pattern.

It is an additional aspect of the present invention, as set forth above, to provide a fixture in conjunction with the 360° light pattern so that all light emanating therefrom is directed downwardly.

It is still yet another aspect of the present invention, as set forth above, to provide a pair of circular rods with a light source therebetween and, if desired, light sources above the rods so that the resulting housing emanates light from each side and downwardly through the lens assembly.

It is still yet a further aspect of the present invention, as set forth above, to provide a triple beam lighting apparatus, wherein a single light is positioned adjacent three circular rods, wherein one rod generates a single outward beam and the other two circular rods emanate light beams which may be re-directed outward by a reflective assembly.

It is yet an additional aspect of the present invention, as set forth above, to include an adjustment assembly to adjust the position of each mirror in the reflective assembly to form a desired projected light pattern.

It is another aspect of the present invention, as set forth above, to provide the adjustment assembly with an adjustment knob with a spring-biased set pin to allow for selective adjustment of the knob to control the positioning of the mirrors and thus, the output of the triple beam lighting apparatus.

It is yet another aspect of the present invention, as set forth above, to provide a brush bar lighting apparatus with opposed mounting brackets which carry a tube therebetween, wherein the tube receives a circular glass rod and wherein the tube has openings opposite light sources which project light beams through the openings.

It is still another aspect of the present invention, as set forth above, to provide a driving circuit which converts a DC power supply to an AC voltage which is then stepped to an appropriate voltage to operate a lamp that is positioned adjacent the circular rod lens assembly.

The foregoing and other aspects of the present invention, which shall become apparent as the detailed description proceeds, are achieved by a lighting apparatus, comprising a housing, at least one lens assembly carried by the housing, the lens having opposed convex surfaces separated by a radial distance greater than or equal to a radius of the convex surfaces, and at least one light carried by the housing, the light positioned adjacent one of the convex surfaces and projecting a high-intensity light beam from the other convex surface.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 16 is a schematic side view of a triple beam lighting apparatus according to the present invention;

FIG. 18 is a front elevational view of a brush bar embodiment employing the concepts of the present invention;

FIG. 19 is a side elevational view of the brush bar embodiment shown in FIG. 18; and FIG. 20 is a schematic diagram of a driving circuit for the lighting apparatuses shown and described herein.

BEST MODE FOR CARRYING OUT THE INVENTION

Figure 1:
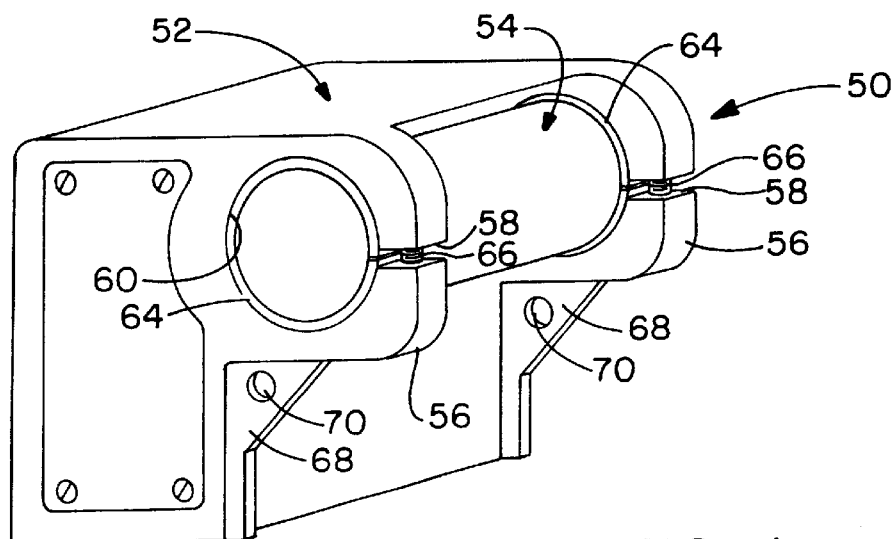
FIG. 1 is a perspective view of a lighting apparatus with a housing carrying a lens assembly according to the present invention.
Figure 2:
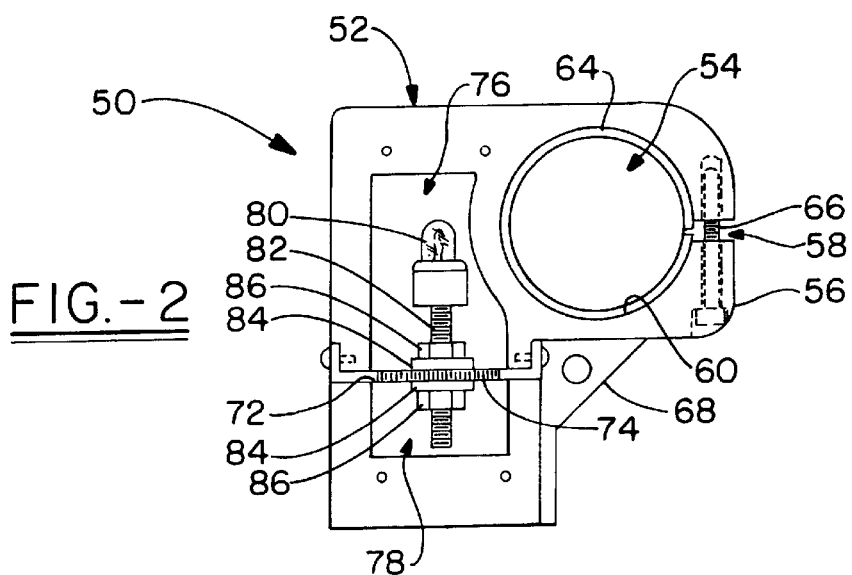
FIG. 2 is a partial cross-sectional view of the lighting apparatus shown in FIG. 1.

Referring now to the drawings and more particularly, to FIGS. 1–4, it can be seen that a lighting apparatus, according to the present invention, is designated generally by the numeral 50. As shown, the lighting apparatus 50 includes a housing 52 which carries a lens assembly 54. The housing includes opposed extending flanges 56, wherein each one of the flanges has a slit 58 and a hole 60 aligned with the opposite hole 60. A gasket 64 is disposed around each end of the lens assembly 54 and received in each hole 60. A set screw 66 is employed to tighten the flanges around the lens 54 so that it stays in place during use. Each extending flange 56 is supported by a mounting gusset 68 which has a mounting hole 70 therethrough. The mounting hole 70 may be employed to mount the apparatus on any other device, such as an automobile or other supporting structure. In the preferred embodiment, lens assembly 54 is a circular rod made of glass or other like material which allows the efficient transmission of light therethrough.

Figure 3:
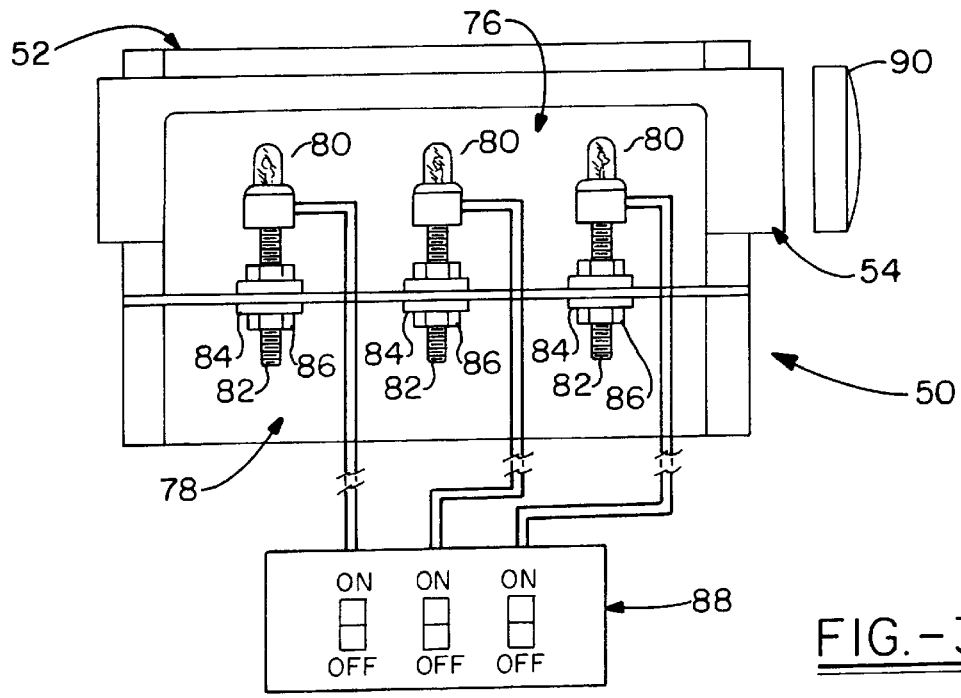
FIG. 3 is a rear elevational view of the apparatus shown in FIG. 1.

In order to transmit light according to the concepts of the present invention, a shelf 72 extends along the length of the housing 52. The shelf 72 is provided with a plurality of slotted cavities 74. Additionally, the shelf 72 defines a bulb cavity 76 and a lower cavity 78. The shelf 72 supports a light or bulb 80 carried in a ceramic base with extending wires in each of the slotted cavities 74. In particular, a threaded post 82 carries each bulb 80 and is received in each corresponding cavity 74. A plurality of washers 84 and nuts 86 are associated with each threaded post 82 to allow for the vertical height adjustment of each bulb 80 as desired by the end user. Moreover, the loosening of the washers 84 and nuts 86 allows for selective positional adjustment in the slotted cavity 74 closer to or away from the lens 54 as desired. As best seen in FIG. 3, the wires of each bulb are connected to a plurality of switches 88 to allow for the user to selectively energize one or all of the lights as needed. An end cap 90 may be employed to cover each end of the lens 54 as needed.

Figure 4:
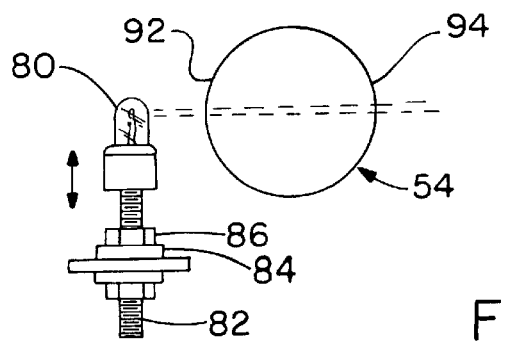
FIG. 4 is a side view of a light positioned adjacent a lens assembly with a convex entry and exit portion.

The lens assembly 54, as best seen in FIG. 4, provides a convex entry portion 92 that abuts or is closely adjacent the bulb 80. The lens 54 provides a convex entry portion 92 and a convex exit portion 94. It has been determined that the positioning of the bulb 80 adjacent the convex entry portion 92 is critical in the formation of a high intensity light beam. In the preferred embodiment, the bulb 80 is placed no further than a radial dimension of the circular rod from the rod. It has been found that if the bulb is moved further than this distance, that the light beam becomes diffuse and is not as bright as desired. Ideally, the bulb 88 is placed about one-half the radius of the rod from the convex entry portion 92. Those skilled in the art will appreciate that the lens 54 does not have to be circular in shape, but it must provide at least a convex entry and exit portion. The lens may be an ellipsoid or oval shape, wherein placement of the bulb is controlled by the radial dimension of the convex entry portion. Additionally, the housing should provide supporting structure positioned between the entry and exit portions so that the light is directed through the convex exit portion in a concentrated manner.

The advantages of the apparatus 50 are readily apparent. The present construction does not require the use of a reflector to transmit light through the lens. Use of a rod for the lens 54 generates a wide beam, defined by the length of the rod, that may be projected in most any direction. Multiple lights may be positioned adjacent the lens and selectively energized to provide the desired light pattern. The apparatus 50 and variations thereof, which are described in detail hereinbelow, may be used with motorcycles, emergency vehicles, police cars, utility vehicles, boats, helicopters, planes, building security lights, landscaping lights, and even flashlights. The apparatus 50 may also be used with underwater vehicles, snowmobiles, and ATVs.

Figure 5:
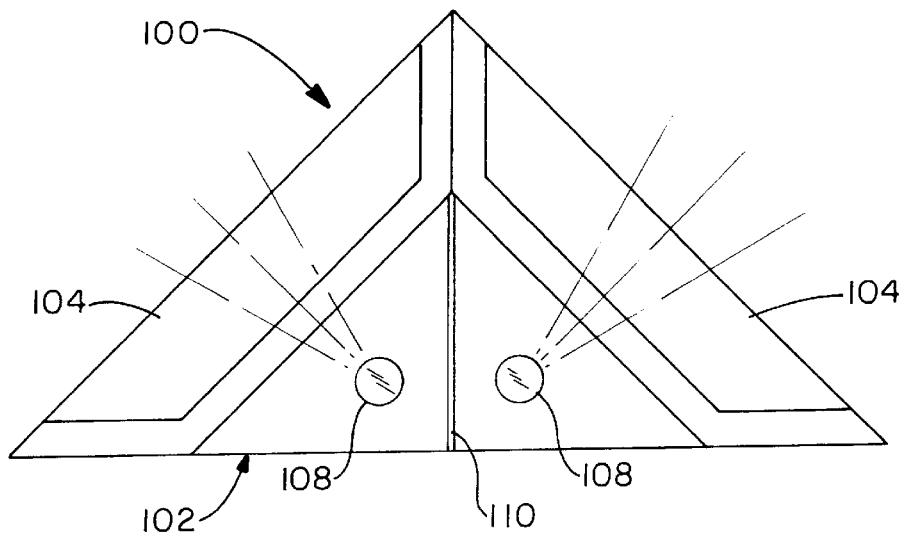
FIG. 5 is a plan view of a lighting apparatus with two lenses carried therein.

Referring now to FIG. 5, a lighting apparatus according to a variation of the present invention, is designated generally by the numeral 100. The apparatus 100 includes a housing 102 which carries a pair of angled lenses 104. Each lens 104 is a circular rod with each end cut at a like angle. One end of each lens 104 is then placed adjacent the other to form a light distribution pattern that generates two angularly directed beams when light sources 108 are placed adjacent to each lens 104 as described above. A barrier 110 may be provided between the angular cut ends of each lens 104. This allows for selective use of each lens without light inadvertently emanating from the bulb furthest away.

Figure 6:
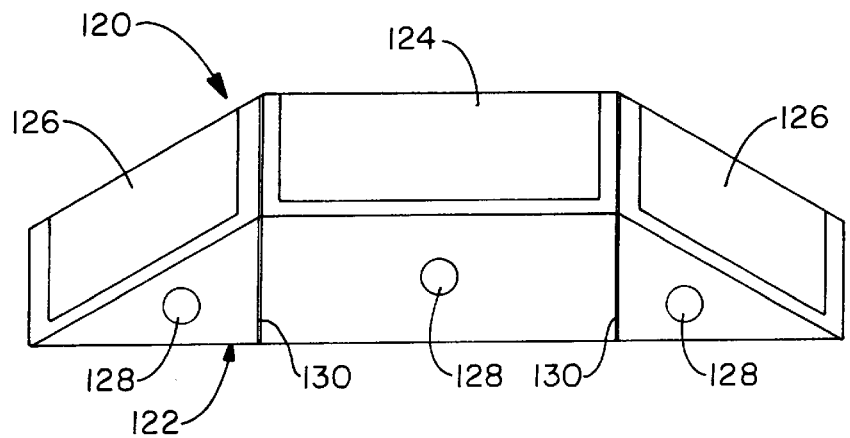
FIG. 6 is a plan view of a lighting apparatus with three lenses carried therein.

Referring now to FIG. 6, a lighting apparatus is generally indicated by the numeral 120, which provides a somewhat similar light distribution pattern as shown in the previous embodiment. The apparatus 120 includes a housing 122 which carries a center lens 124 positioned adjacent two side lenses 126. A light source 128 is positioned adjacent each lens 124 and 126. Lenses 126 are provided with an angular cut and abut each end of lens 124 in an angular direction. This light pattern generates a somewhat angularly directed light beam pattern with three beam components. A barrier 130 may be disposed between each lens 124 and the lenses 126. This allows for selective use of each lens without emanating light through a neighboring lens.

Figures 7, 8:
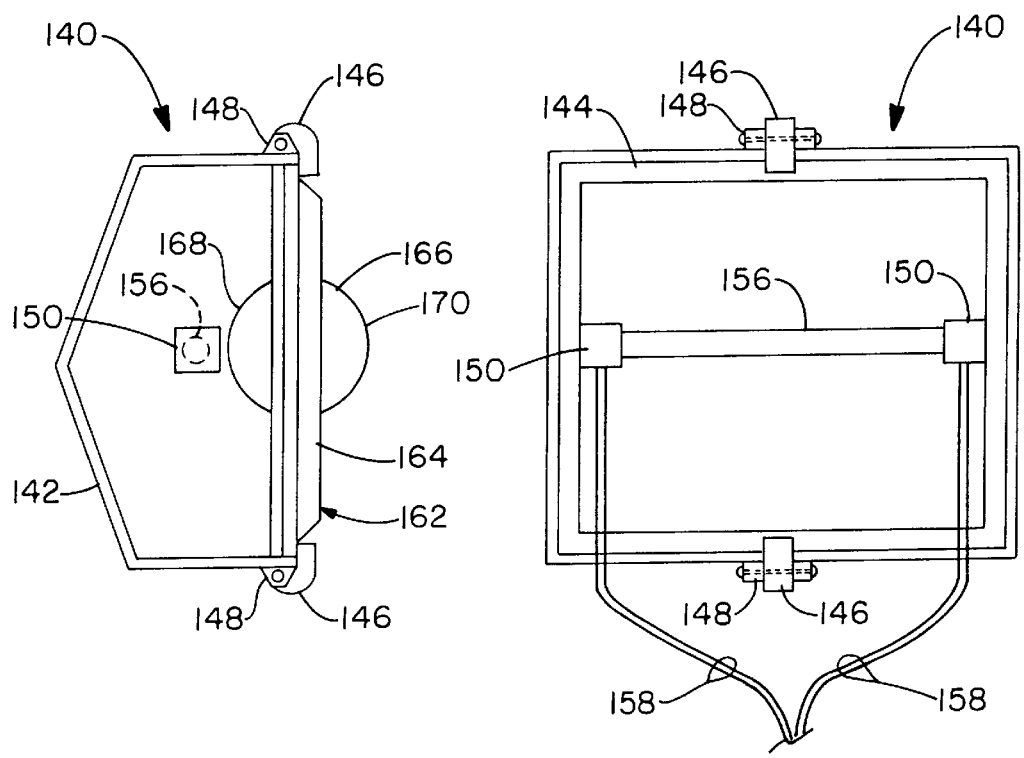
FIG. 7 is a side elevational view, in partial cross-section, of an alternative embodiment of the present invention.
FIG. 8 is a front elevation view, with the lens assembly removed, of the alternative embodiment.

Another lighting apparatus, according to the present invention, is shown in FIGS. 7 and 8, and is designated generally by the numeral 140. The apparatus 140 includes a housing 142 that provides a support frame 144 and a pair of clasps 146 at about a mid-portion of the vertical portions of the support frame 144. Each clasp 146 includes a hinge pin 148. Each apparatus 140 includes a pair of ceramic lamp sockets 150 which hold a lamp 156. The lamp 156 receives electrical energy through wires 158.

A lens assembly 162 is received and carried by the support frame 144 and held in place by the clasps 146. Those skilled in the art will appreciate that the lens assembly 162 is a replacement-type feature which allows for conversion of a lighting apparatus with a normal flat cover into an apparatus having the properties and advantages described in FIGS. 1–6. Each lens assembly 162 includes a flat portion 164 from which projects a round portion 166. The round portion 166 is comparable to the circular rod lens described above. The round portion 166 includes a concave entry portion 168 and a concave exit portion 170. The concave entry portion 168 is positioned adjacent the lamp 156 to provide the desired high intensity wide beam.

The advantages of the this construction is that existing lamp assemblies can be converted to project a wide, high-intensity beam. This would be useful whenever a large wide area, such as a driveway or billboard, needs to be illuminated in an efficient manner.

Figure 9:
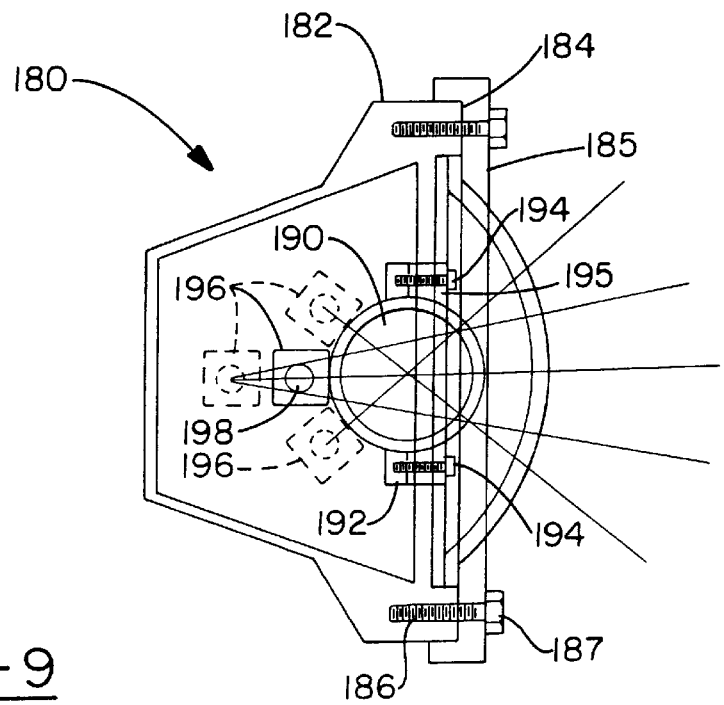
FIG. 9 is a side elevational view, in partial cross-section, of another alternative embodiment of the present invention.
Figure 10:
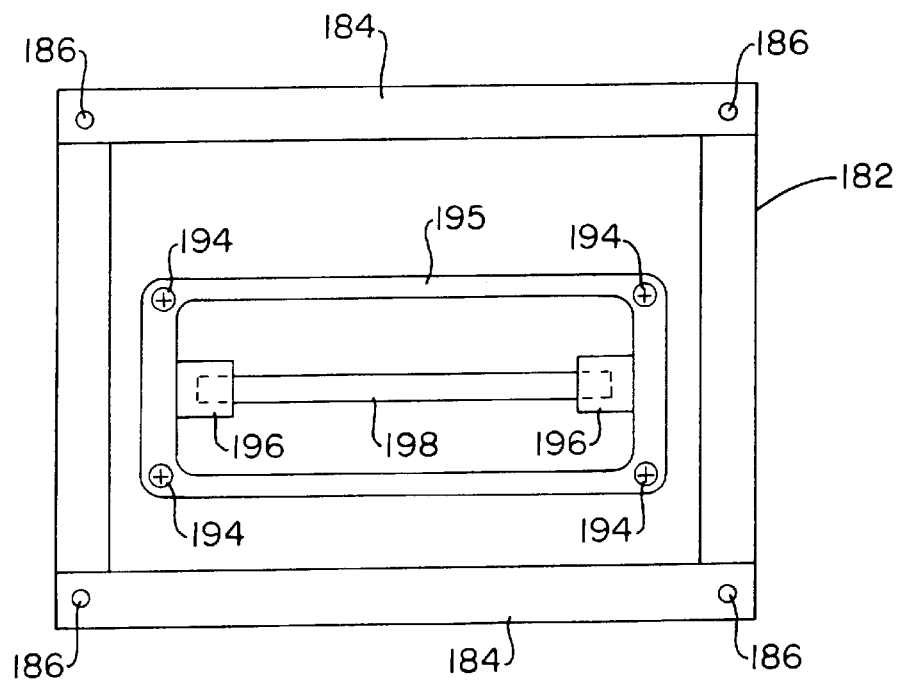
FIG. 10 is a front elevation view, with the lens assembly removed, of the alternative embodiment shown in FIG. 9.

Referring now to FIGS. 9 and 10, a lighting apparatus, according to the present invention, is designated generally by the numeral 180. The apparatus 180 is similar to that shown in FIGS. 7 and 8; however, it is an original manufactured item and does not employ the retro-fit lens assembly. The apparatus 180 includes a housing 182 which provides a cover support frame 184 to detachably receive a cover 185. The cover support frame 184 includes threaded openings 186 for receiving fasteners 187 to fasten the cover 185 to the support frame 184. A lens 190 is carried by the housing 182 in a support bracket 192. The support bracket 192 has a concave shape which conforms to the convex shape of the lens 190. A plurality of threaded fasteners 194 are employed to secure a lens cover 195 over the lens 190. As in the previous embodiment, a pair of ceramic lamp sockets 196 are employed to hold a lamp 198. As best seen in FIG. 9, the lamp sockets 196 are movable about the lens support bracket 192 to allow for adjustment of the positional direction of the beam emanating from the lens 190. The lens 190, as in the previous embodiments, is a circular rod with all of the features described above. It will also be appreciated that in addition to the radial movement of the lamp sockets 196, the lamp socket may be positionable away from the rod lens 190 as desired.

Figure 11:
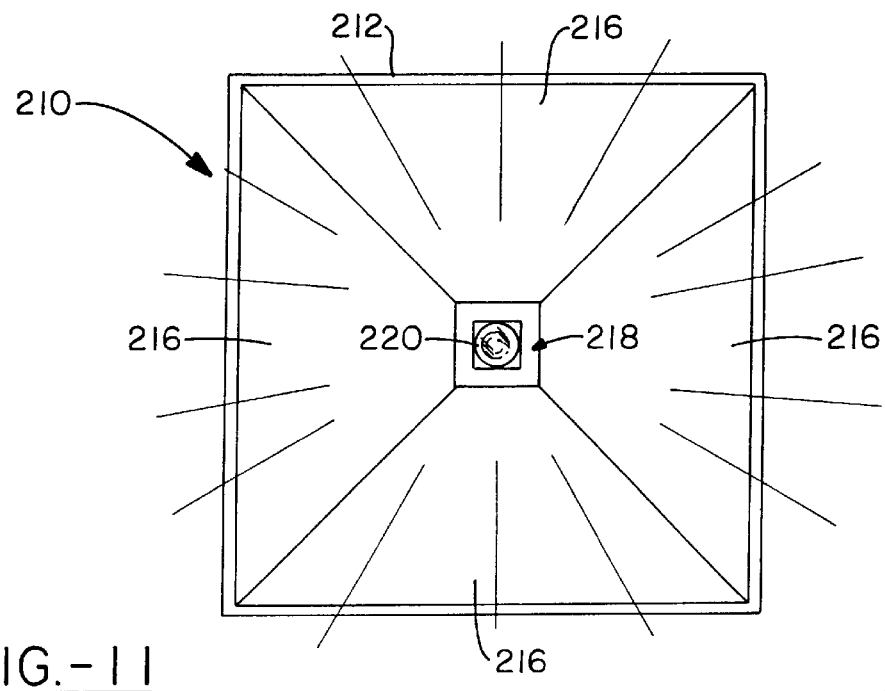
FIG. 11 is a plan view of another embodiment with four lenses to provide a 360° light distribution pattern.
Figure 12:
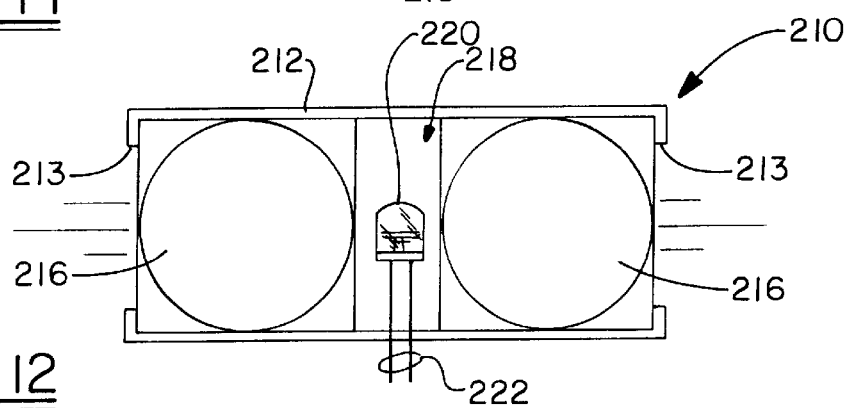
FIG. 12 is an elevational view, in partial cross-section, of the embodiment shown in FIG. 11.

Referring now to FIGS. 11 and 12, a lighting apparatus, which generates a 360° light pattern, is designated generally by the numeral 210. The apparatus 210 includes a housing 212 which provides a series of openings 213 about the periphery thereof. The housing 212 carries a lens assembly 214 which includes a plurality of rods 216 which are as described above. In the present embodiment, the rods 216 have about a 45° angle cut at each end so that they may abut each other to form a rectangular or square configuration. The four rods 216 form a center opening 218 which allows for receipt of a light source or lamp 220. The lamp 220 is vertically positionable within the opening 218 such that a filament of the lamp 220 is adjacent and substantially parallel each of the four rods 216. Wires 222 extend from the lamp 220 to receive the necessary electrical power to illuminate the lamp and provide the 360° light distribution. As shown in FIG. 12, the lamp is positioned at about a mid-point of the rods 216; however, it will be appreciated that the lamp 218 may be vertically positioned slightly above or slightly below each of the rods so as to provide a directional beam that extends in a corresponding downward or upward direction from the lamp 220. Positioning of the lamp 220 may be controlled by the manufacturer of the device or by the end user.

Figure 13:
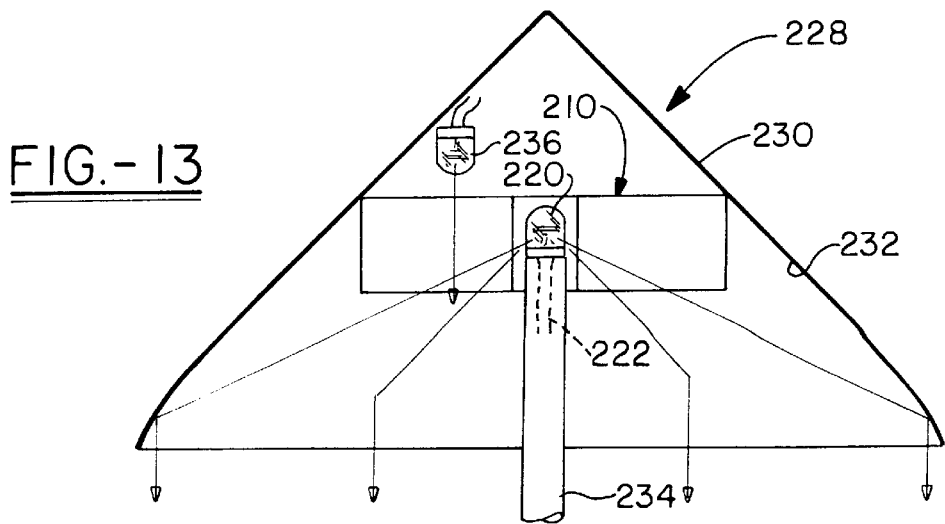
FIG. 13 illustrates the 360° lighting apparatus carried in a fixture for downward projection of the light beam pattern.

Referring now to FIG. 13, a fixture, which is designated generally by the numeral 228, receives the apparatus 210 described above. The fixture 228 may be employed to take advantage of the 360° light distribution pattern and to direct it downwardly so as to illuminate landscaping, walkways, the underside of automobiles, or the like. The fixture 228 includes a hood 230 which has a reflective surface 232 on the interior portion thereof. A shaft 234 carries the lamp 220 and may also be used to provide support to the apparatus 210 within the fixture 228. If desired, extra or additional lamps 236 may be positioned above the apparatus 210 so as to provide additional lighting in a downward direction from the fixture 228.

Figure 14:
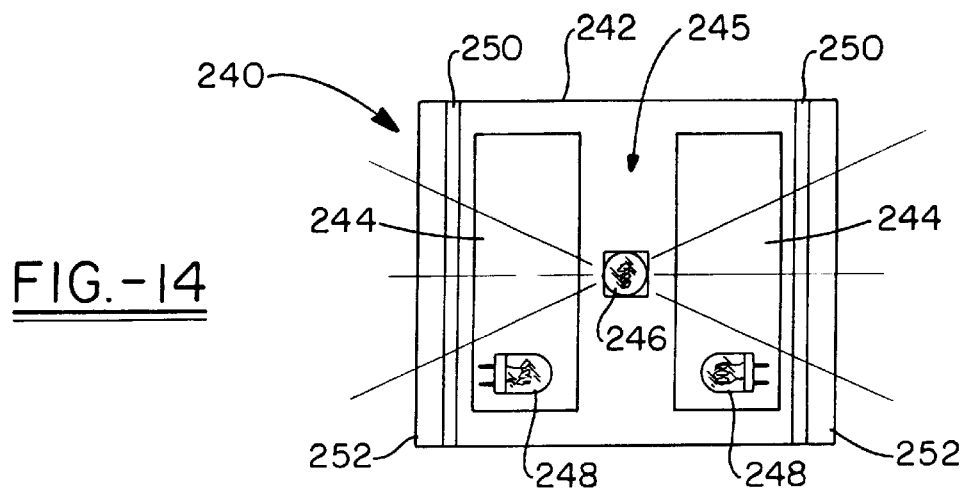
FIG. 14 is another alternative embodiment illustrating parallel lenses with a light source therebetween and a light source positioned thereabove.

Yet another variation of the light apparatus according to the present invention is shown in FIG. 14 and designated generally by the numeral 240. The apparatus 240 includes a housing 242 with two opposed rods 244 positioned side-by-side in a parallel arrangement. A space 245, provided between the two rods 244, allows receipt of a lamp 246. As will be appreciated, this generates light in an outward direction. Additional lights 248 may be provided so as to project light downwardly through the lenses 244. If desired, a color filter 250 may be provided adjacent each lens 244 to provide the desired effect for the outwardly directed light. A substantially transparent cover plate 252 is carried by the housing to hold each filter 250 in place.

Figure 15:
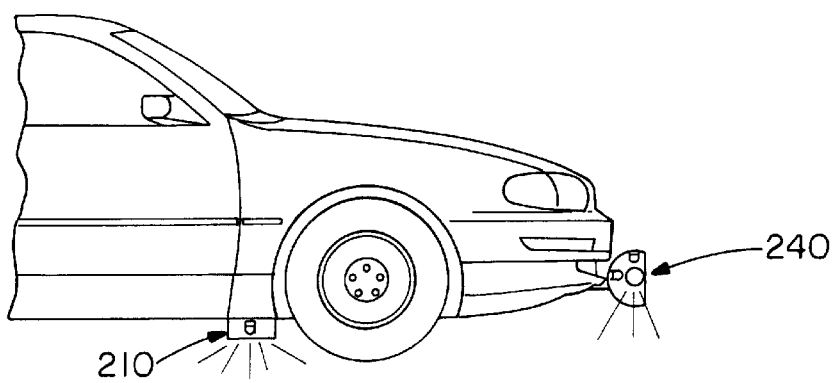
FIG. 15 illustrates the embodiments shown in FIGS. 11 and 14 associated with an automobile.

As best seen in FIG. 15, the fixture 210 may be placed under an automobile while the apparatus 240 may be provided on a bumper. Of course, these lighting devices may be used with other vehicles or for other uses.

Referring now to FIG. 16, a triple beam lighting apparatus according to the concepts of the present invention is designated generally by the numeral 260. The apparatus 260 employs the basic concepts of the previous embodiments, but includes additional rods to provide a desired effect with just one light source. The apparatus 260 includes a housing 262 which carries a side lens 264, a mid-lens 266, and a side lens 268. The lenses 264–268 may be positioned at about 90° intervals around the light 270 such that each lens is in a substantially parallel relationship with the other. If desired, the lenses 264–268 may be positioned at other angular intervals such as 120°. This allows the lenses to be positioned closer to the light 270 and results in a more efficient use of light.

A reflection assembly 272 is provided to direct the light beams generated by the side lenses 264 and 268 in the same direction as the light beam generated by the mid-lens 266. The reflection assembly 272 includes a mirror 274 pivotable around a hinge pin 276. The mirror 274 is positioned opposite the light 270 with the lens 264 therebetween. Likewise, a mirror 278 is pivotable around a hinge pin 280 and is positioned opposite the side lens 268 from the light 270 to provide for directing the associated beam in the same direction as the mid-lens 266. Accordingly, light beams 282 are generated by each of the lenses 264–268 in a triple-beam configuration. As such, three wide beams are directed from the housing 262 in substantially parallel planes. The positioning of the reflection assembly 272 controls the positioning of the mirrors 274 and 278 and in turn, the beams generated by their respective lenses. Accordingly, the light beams may be configured so as to converge into one light beam at a predetermined distance. Each mirror may be adjusted individually or collectively or, if desired, only two lenses may be employed with the mid-lens 266 removed from use.

Figure 17:
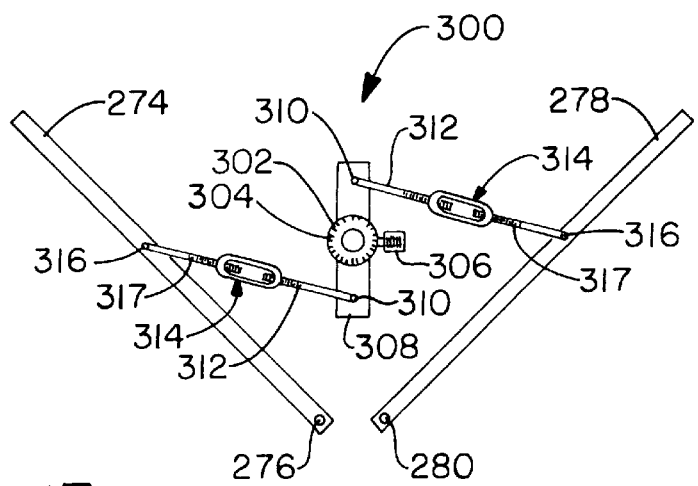
FIG. 17 is a schematic view of an adjustment assembly associated with the triple beam lighting apparatus for adjusting the position of mirrors contained therein.

As seen in FIG. 17, an adjustment apparatus for moving the mirrors 274 and 278 is designated generally by the numeral 300. The apparatus 300, which is supported and carried by the housing 262, includes an adjustment knob 302 with a plurality of notches 304 distributed about the periphery thereof. A spring-biased set pin 306 is employed to control the positioning of the knob 302 and hold both of the mirrors in place. The adjustment knob 302 is coupled or fixed to a bracket 308 which has a pivot pin 310 at each end thereof. An adjustment rod 312 extends from each respective pivot pin 310 and is received in a calibration tube 314. Extending from each end of the calibration tube 314 is another rod 317 which is coupled to each respective mirror. Accordingly, when the set pin 306 is disengaged from the adjustment knob 302, rotation of the knob allows for angular adjustment of the mirrors and, in turn, the light beams emanating from the lenses 264 and 268.

Referring now to FIGS. 18 and 19, a brush bar lighting apparatus, according to the present invention, is generally indicated by the numeral 320. The apparatus 320 includes opposed mounting brackets 322 for carrying a holding tube 324. The holding tube 324 provides a plurality of openings 325. The openings 325 may extend along the length of the entire tube 324 or the openings may be provided in short segments. The tube carries a lens or rod 326. A light 330 is positioned adjacent the lens 326 at a position approximately opposite the openings 325. Accordingly, a light beam is generated through the openings 325. Of course, the brush bar 320 may be mounted to an automobile or other device so as to provide a wide, high-intensity beam as previously described.

Referring now to FIG. 20, a driving circuit is designated generally by the numeral 350. The driving circuit 350 may be employed with a very high intensity discharge bulb or a halogen bulb that is driven by an AC current. Such a driving circuit 350 may be employed for portable or handheld variations of the apparatus as described above. The driving circuit 350 includes a grounded DC source 352. A fuse 354 is connected to the DC source 352 as a safety precaution. The DC source 350 may be coupled to a DC to AC converter which has an output connected to a step transformer 358. The output of the transformer 358 is connected to a lamp 360 which is positioned adjacent a lens assembly 364 as described in the embodiments above.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of true scope and bread the of the invention, reference should be made to the following claims.

What is claimed is:

1. A lighting apparatus, comprising:
   a housing;
   at least two lens assemblies carried by said housing, each said lens assembly having opposed convex surfaces separated by a radial distance greater than or equal to a radius of said convex surfaces, each said lens having an annular cut at an end thereof, said angular cut ends abutting one another in said housing; and
   at least one light source carried by said housing, said light source is positioned no further than said radial distance from one of said convex surfaces and projecting a high-intensity light beam from said other convex surface.

2. The lighting apparatus according to claim 1, wherein said lens assembly is a circular rod.

3. The lighting apparatus according to claim 2, wherein said at least one light is positioned no further than a radial dimension of said circular rod.

4. The lighting apparatus according to claim 1, wherein said lens assembly is an oval rod.

5. The lighting apparatus according to claim 1, further comprising:
   a support panel carried in said housing, said at least one light selectively moveable adjacent to said one convex surface to selectively adjust the orientation of said high intensity beam.

6. The lighting apparatus according to claim 5, wherein said housing includes a pair of extending flanges, each said flange having a hole for receiving said lens.

7. The lighting apparatus according to claim 1, wherein said lens assembly includes three lenses carried by said housing, said three lenses including:
   a center lens having opposed ends; and
   two side lenses, each said side lens having a substantially angular cut which is positioned adjacent a corresponding end of said center lens, each said lens having a light associated therewith.

8. The lighting apparatus according to claim 1, wherein said lens assembly includes four circular rod lenses, each said lens having opposed ends with angular cuts that are adjacently positioned one another so as to form an opening for receiving said at least one light.

9. The lighting apparatus according to claim 8, wherein said at least one light is selectively movable adjacent to said one convex surface of each said lens.

10. The lighting apparatus according to claim 8, further comprising:
    a fixture positioned over said lens assembly; and
    a shaft for carrying said at least one light, said shaft adjusting the position of said at least one light in said opening.

11. The lighting apparatus according to claim 10, further comprising:
    a second light source placed adjacent said lens assembly, away from said opening and between said fixture and said lens assembly.

12. The lighting apparatus according to claim 1, further comprising:
    a driving circuit electrically connected to said at least one light source, said driving circuit including a DC power source connected to a DC to AC converter which generates a signal to illuminate said at least one light.

13. A lighting apparatus, comprising:

a housing, at least one lens assembly carried by said housing, said lens having opposed convex surfaces separated by a radial distance greater than or equal to a radius of said convex surfaces; and at least one light source carried by said housing, said light source is positioned no further than said radial distance from one of said convex surfaces and projecting, a high-intensity light beam from said other convex surface, wherein said at least one lens assembly is a substantially flat lens with said convex surfaces extending therefrom.

14. The lighting apparatus according to claim 13, wherein said housing includes a lens support bracket having a concave shape that substantially conforms to the shape of one of said convex surfaces of said at least one lens.

15. The lighting apparatus according to claim 14, wherein said at least one light is radially positionable with respect to said at least one lens.

16. A lighting apparatus, comprising:

a housing;

at least one lens assembly carried by said housing, said lens having opposed convex surfaces separated by a radial distance greater than or equal to a radius of said convex surfaces;

at least one light source carried by said housing, said light source is positioned no further than said radial distance from one of said convex surfaces and projecting a high-intensity light beam from said other convex surface;

a pair of opposed mounting brackets, wherein said housing includes a holding tube carried at each end by one of said mounting brackets, said holding tube having at least one opening, wherein said lens assembly is a circular rod received in said holding tube; and wherein a light is positioned adjacent said circular rod directly opposite said opening.

17. A lighting apparatus, comprising:

a housing;

at least two lens assemblies carried by said housing, each said lens assemblies having opposed convex surfaces separated by a radial distance greater than or equal to a radius of said convex surfaces, said at least two lens assemblies spaced apart from one another; and at least one light source carried by said housing, said light source is positioned no further than said radial distance from one of said convex surfaces and projecting a high-intensity light beam from said other convex surface.

18. The lighting apparatus according to claim 17, wherein said second lens assembly is substantially parallel with said one lens assembly with an opening therebetween to receive said at least one light; and said apparatus further comprising:

a color filter associated with each said lens assembly and carried by said housing.

19. The lighting apparatus according to claim 18, further comprising:

additional light sources placed adjacent each respective lens assembly.

20. The lighting apparatus according to claim 17, wherein said second lens assembly is positioned adjacent said at least one light source; said apparatus further comprising:

a third lens positioned adjacent said at least one light source at a side opposite said second lens assembly; and a reflection assembly proximally positioned said second and third lenses, wherein said at least one light source generates a second and a third high intensity beam reflected by said reflection assembly in the same general direction as said first high intensity beam.

21. The lighting apparatus according to claim 20, wherein said reflection assembly comprises:

an adjustable mirror associated with said second lens to direct said second high intensity beam; and another adjustable mirror associated with said third lens to direct said third high intensity beam.

22. The lighting apparatus according to claim 21, further comprising:

an adjustment assembly coupled between said hinged mirror and said another hinged mirror, said adjustment assembly including an adjustment kob fixed to a bracket at about a mid-point thereof, each end of said bracket connected to a respective hinged mirror by a calibration tube, said adjustment knob selectively held in place by a set pin, wherein rotation of said adjustment knob controls positioning of said mirrors and said second and third high intensity beams.

* * * * *